United States Patent
Kim et al.

(10) Patent No.: US 12,431,120 B2
(45) Date of Patent: Sep. 30, 2025

(54) METHOD, DEVICE, AND NON-TRANSITORY COMPUTER-READABLE RECORDING MEDIUM TO PROVIDE AUDIO ENGAGEMENT SERVICE FOR COLLECTING PRONUNCIATIONS BY ACCENT

(71) Applicant: NAVER CORPORATION, Seongnam-si (KR)

(72) Inventors: Somi Kim, Seongnam-si (KR); Jonghwan Kim, Seongnam-si (KR); Sungran Park, Seongnam-si (KR); Dongwoon Kim, Seongnam-si (KR); Linyu Huang, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 268 days.

(21) Appl. No.: 17/935,378

(22) Filed: Sep. 26, 2022

(65) Prior Publication Data

US 2023/0095928 A1    Mar. 30, 2023

(30) Foreign Application Priority Data

Sep. 27, 2021   (KR) .................. 10-2021-0127254
Feb. 24, 2022   (KR) .................. 10-2022-0024602

(51) Int. Cl.
*G10L 13/08*    (2013.01)

(52) U.S. Cl.
CPC .................... *G10L 13/086* (2013.01)

(58) Field of Classification Search
CPC ....... G10L 13/086; G10L 15/26; G06Q 10/10; G06Q 30/0282; G06Q 50/01; G06Q 50/20; G09B 19/06
See application file for complete search history.

(56) References Cited

U.S. PATENT DOCUMENTS

| | | | | |
|---|---|---|---|---|
| 5,920,838 A | * | 7/1999 | Mostow | G09B 5/065 704/266 |
| 8,805,673 B1 | * | 8/2014 | Neff | G06F 16/9537 704/8 |
| 2002/0013707 A1 | * | 1/2002 | Shaw | G10L 15/063 704/257 |
| 2006/0143008 A1 | * | 6/2006 | Schneider | G10L 15/063 704/251 |
| 2008/0208574 A1 | * | 8/2008 | Chen | G10L 13/08 704/221 |

(Continued)

FOREIGN PATENT DOCUMENTS

| | | |
|---|---|---|
| JP | 2017516245 A | 6/2017 |
| JP | 102161559 B1 | 10/2020 |

(Continued)

*Primary Examiner* — Fariba Sirjani

(74) *Attorney, Agent, or Firm* — GREER BURNS & CRAIN, LTD.

(57) ABSTRACT

A method, device and non-transitory computer-readable recording medium provide an audio engagement service for collecting pronunciations by accent. An audio engagement service method includes setting an accent indicating a country, an ethnic group, or a geographic region of a participant; generating audio uttered by the participant of a given example text into pronunciation content of the accent; and providing the pronunciation content with information on the accent.

19 Claims, 17 Drawing Sheets

(56) References Cited

U.S. PATENT DOCUMENTS

| | | | | |
|---|---|---|---|---|
| 2008/0228390 | A1* | 9/2008 | Geelen | G01C 21/3691 |
| | | | | 701/408 |
| 2010/0305945 | A1* | 12/2010 | Krishnaswamy | G10L 17/00 |
| | | | | 704/235 |
| 2011/0282662 | A1* | 11/2011 | Aonuma | G10L 17/26 |
| | | | | 704/E15.001 |
| 2011/0282669 | A1* | 11/2011 | Michaelis | G10L 25/90 |
| | | | | 704/270 |
| 2017/0205964 | A1* | 7/2017 | Rivero | H04L 67/567 |
| 2019/0384811 | A1* | 12/2019 | Sen | G06F 40/35 |
| 2021/0034661 | A1* | 2/2021 | Pande | G10H 1/0008 |
| 2023/0095928 | A1* | 3/2023 | Kim | G06Q 50/01 |
| | | | | 704/200 |

FOREIGN PATENT DOCUMENTS

| | | |
|---|---|---|
| JP | 6900723 B2 | 7/2021 |
| KR | 100816378 B1 | 3/2008 |
| KR | 101587866 B1 | 1/2016 |
| KR | 1020190080834 A | 7/2019 |
| KR | 1020200008230 A | 1/2020 |
| KR | 1020200133298 A | 11/2020 |
| KR | 102195925 B1 | 12/2020 |

\* cited by examiner

1700

METHOD, DEVICE, AND NON-TRANSITORY COMPUTER-READABLE RECORDING MEDIUM TO PROVIDE AUDIO ENGAGEMENT SERVICE FOR COLLECTING PRONUNCIATIONS BY ACCENT

CROSS-REFERENCE TO RELATED APPLICATION(S)

This U.S. non-provisional application claims the benefit of priority under 35 U.S.C. § 119 to Korean Patent Application No. 10-2021-0127254 filed on Sep. 27, 2021, and Korean Patent Application No. 10-2022-0024602 filed on Feb. 24, 2022, in the Korean Intellectual Property Office (KIPO), the entire contents of which are incorporated herein by reference.

BACKGROUND OF THE INVENTION

Field of Invention

One or more example embodiments of the present invention relate to technology for collecting and providing pronunciation content for language learning.

Description of Related Art

All language education including English education has been mostly performed using an offline method of delivering educational contents by an instructor in a classroom. Recently, an online education method through the Internet has been gradually expanding.

Among online education methods, there are a video lecture method that transmits an education course of an instructor through the Internet, an education method using an electronic blackboard and speech, and a video conference system (VCS) method for video chatting.

As an example of an online education method, a method for studying English pronunciation using representative word pronunciation that may accurately teach pronunciation of words or sentences using the Internet is disclosed in Korean Patent Registration No. 10-0816378 (registered on Mar. 18, 2008).

BRIEF SUMMARY OF THE INVENTION

One or more example embodiments may collect and provide pronunciation content by each of various accents of each language through audio engagement.

One or more example embodiments may provide a fun element that may collect and build symbols of a country or a region representing an accent according to audio engagement.

One or more example embodiments may strengthen a motivation using various methods, such as a notification according to a user response to an audio participant, a personal profile space, a credible activity certificate, a ranking, and a reward.

According to an aspect of at least one example embodiment, there is provided an audio engagement service method performed by a computer apparatus including at least one processor configured to execute computer-readable instructions included in a memory, the audio engagement service method including, by the at least one processor, setting an accent indicating a country, an ethnic group, or a region of a participant; generating audio uttered by the participant for a given example into pronunciation content of the accent; and providing the pronunciation content with information on the accent.

The generating of the pronunciation content may include giving, to the participant, a symbol stamp of the country or the region corresponding to the accent according to an audio engagement level for generating the pronunciation content.

The symbol stamp may be displayed through a personal page related to the participant.

The audio engagement service method may further include, by the at least one processor, providing a push notification based on a user reaction to pronunciation content maintained by the participant.

The providing of the push notification may include aggregating the user reaction in units of a desired period and providing a push notification about an aggregation result.

The generating of the pronunciation content may include storing the audio as pronunciation content of the example based on a matching rate between a text extracted from the audio through a speech recognition and an original text of the example.

The generating of the pronunciation content may include selecting at least one of a word, an idiom, and a sentence in a dictionary, and providing the same as the example.

The generating of the pronunciation content may include generating the pronunciation content of a tone or a topic specified by the participant.

The generating of the pronunciation content may include tagging at least one of demographic information of the participant, an original text of the example, a type of the original text, tone information and topic information specified by the participant to the pronunciation content, and the providing may include providing pronunciation content of a specific condition using tagging information as a filter condition.

The providing of the push notification may include, in response to a selection on a specific accent from among accents, providing a playlist that includes pronunciation content of the selected accent.

The providing of the push notification may include sorting and providing the pronunciation content based on at least one of a content generation time, a cumulative playback count, a cumulative positive response count, and a cumulative share count.

The providing of the push notification may include providing pronunciation content of a search word and pronunciation content of an idiom or a sentence including the search word by accent with respect to a word search result of a dictionary platform through linkage with the dictionary platform.

The audio engagement service method may further include, by the at least one processor, providing ranking information on the participant based on at least one of a number of pronunciation contents maintained by the participant, a cumulative playback count, a cumulative positive response count, and a cumulative share count.

The audio engagement service method may further include, by the at least one processor, providing activity information that includes at least one of a number of pronunciation contents maintained by the participant, a cumulative playback count, a cumulative positive response count, and a cumulative share count through a personal profile screen of the participant.

The audio engagement service method may further include, by the at least one processor, sharing a personal profile screen or the pronunciation content of the participant.

The audio engagement service method may further include, by the at least one processor, providing the participant with a push notification or feedback about pronunciation content of another participant to which the participant subscribes.

According to an aspect of at least one example embodiment, there is provided a non-transitory computer-readable recording medium storing instructions that, when executed by a processor, cause the processor to computer-implement the audio engagement service method.

According to an aspect of at least one example embodiment, there is provided a computer apparatus including at least one processor configured to execute computer-readable instructions included in a memory. The at least one processor is configured to execute a process of setting an accent indicating a country, an ethnic group, or a region of a participant; a process of generating audio uttered by the participant for a given example into pronunciation content of the accent; and a process of providing the pronunciation content with information on the accent.

According to some example embodiments, it is possible to collect and provide pronunciation content by each of various accents of each language through audio engagement.

According to some example embodiments, it is possible to provide a fun element that may collect and build symbols of a country or a region representing an accent according to audio engagement.

According to some example embodiments, it is possible to strengthen a motivation using various methods, such as a notification according to a user response to an audio participant, a personal profile space, a credible activity certificate, a ranking, and a reward.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
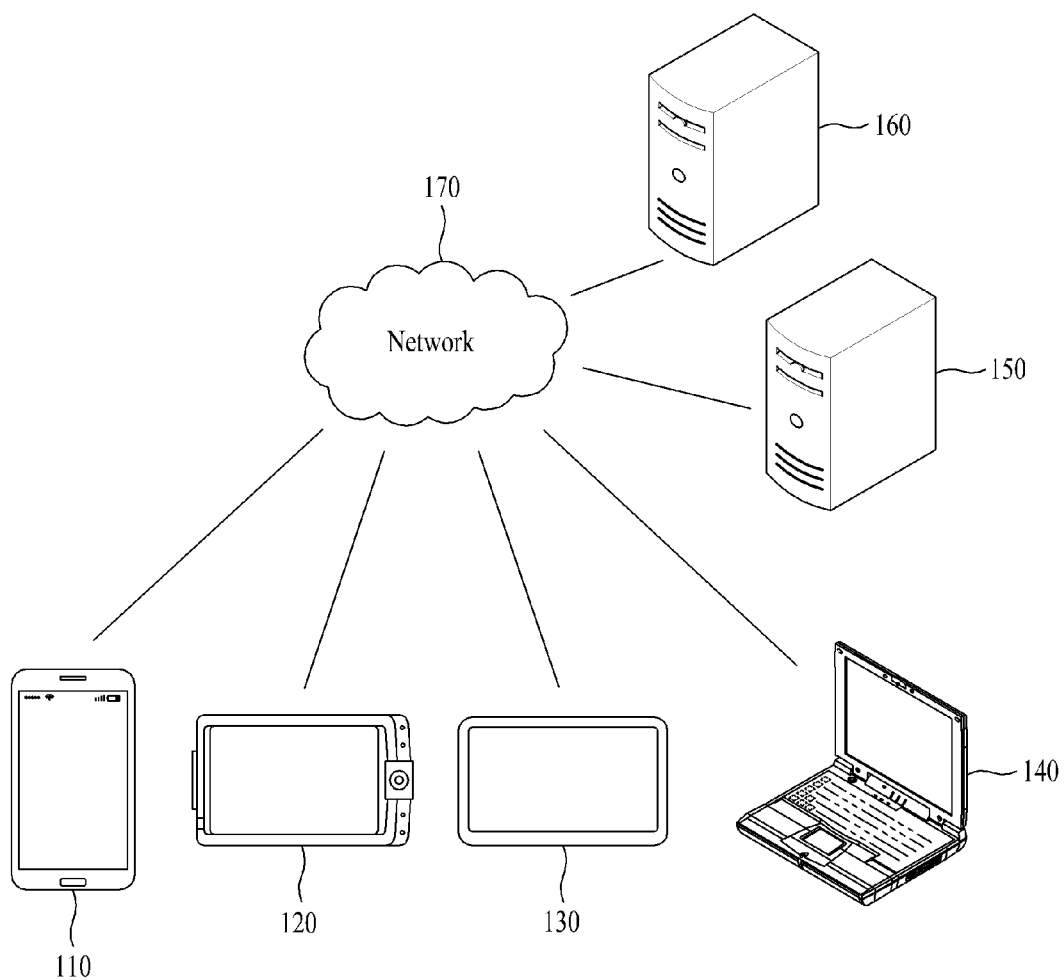
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flowcharts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

The example embodiments relate to technology for collecting and providing pronunciation content for language learning.

The example embodiments set forth herein may provide an audio engagement service for collecting pronunciation content for each of various accents of each language.

An audio engagement service system according to the example embodiments may be implemented by at least one computer apparatus and an audio engagement service method according to the example embodiments may be performed by the at least one computer apparatus included in the audio engagement service system. Here, a computer program according to an example embodiment may be installed and executed on the computer apparatus, and the computer apparatus may perform the audio engagement service method according to the example embodiments under the control of the executed computer program. The aforementioned computer program may be stored in a computer-readable storage medium to computer-implement the audio engagement service method in conjunction with the computer apparatus.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as an example among environments applicable to the example embodiments and the environment applicable to the example embodiments is not limited to the network environment of FIG. 1.

Each of the plurality of electronic devices 110, 120, 130, and 140 may be a fixed terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet personal computer (PC), and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service, for example, an audio engagement service, to the plurality of electronic devices 110, 120, 130, and 140 connected over the network 170.

Figure 2:
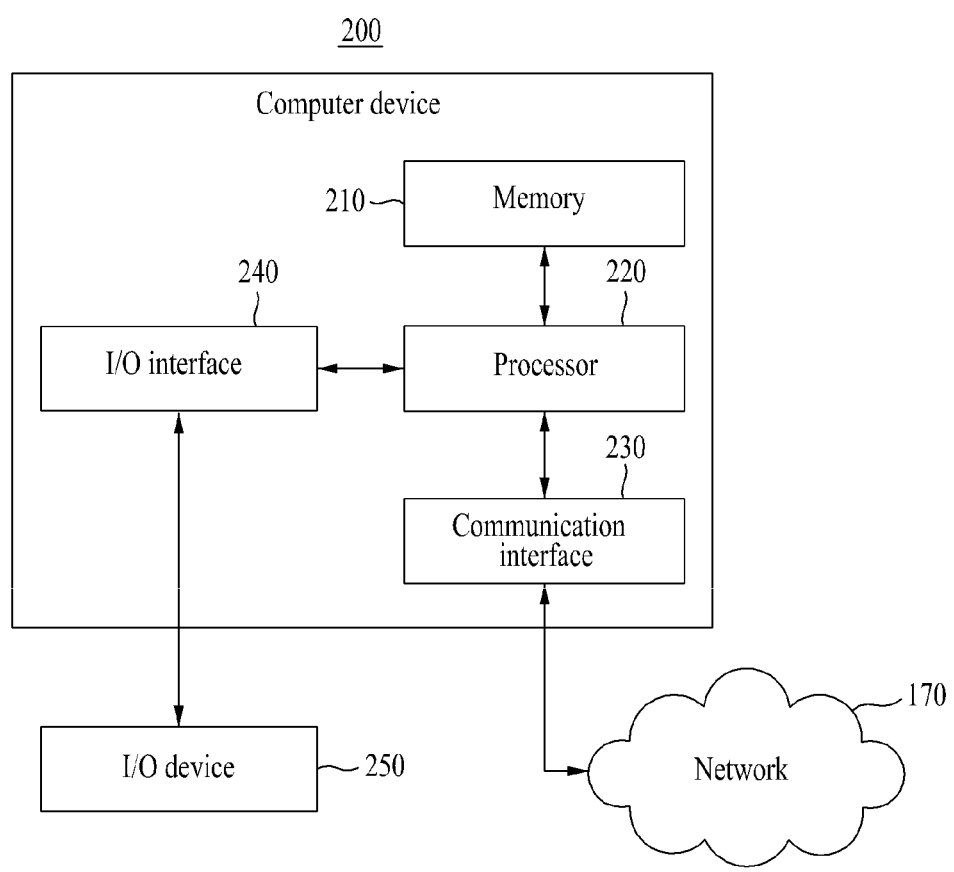
FIG. 2 is a diagram illustrating an example of a computer apparatus according to at least one example embodiment.

FIG. 2 is a block diagram illustrating an example of a computer apparatus according to at least one example embodiment. Each of the plurality of electronic devices 110, 120, 130, and 140 of FIG. 1 or each of the servers 150 and 160 may be implemented by a computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable record medium. The permanent mass storage device, such as ROM and a disk drive, may be included in the computer apparatus 200 as a permanent storage device separate from the memory 210. Also, an OS and at least one program code may be stored in the memory 210. Such software components may be loaded to the memory 210 from another non-transitory computer-readable record medium separate from the memory 210. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 210 through the communication interface 230, instead of the non-transitory computer-readable record medium. For example, the software components may be loaded to the memory 210 of the computer apparatus 200 based on a computer program installed by files received over the network 170.

The processor 220 may be configured to process instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the communication apparatus 200 and another apparatus, for example, the aforementioned storage devices over the network 170. For example, the processor 220 of the computer apparatus 200 may forward a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer apparatus 200 through the communication interface 230 of the computer apparatus 200. For example, a signal, an instruction, content, data, etc., received through the communication interface 230 may be forwarded to the processor 220 or the memory 210, and a file, etc., may be stored in a storage medium, for example, the permanent storage device, further includable in the computer apparatus 200.

The I/O interface 240 may be a device used for interfacing with an I/O apparatus 250. For example, an input device of the I/O apparatus 250 may include a device, such as a microphone, a keyboard, a mouse, etc., and an output device of the I/O apparatus 250 may include a device, such as a display, a speaker, etc. As another example, the I/O interface 240 may be a device for interfacing with an apparatus in which an input function and an output function are integrated into a single function, such as a touchscreen. The I/O apparatus 250 may be configured as a single apparatus with the computer apparatus 200.

According to other example embodiments, the computer apparatus 200 may include greater or less number of components than the number of components shown in FIG. 2. For example, the computer apparatus 200 may include at least a portion of the I/O apparatus 250, or may further include other components, for example, a transceiver, a database, etc.

Hereinafter, example embodiments of a method and apparatus for providing an audio engagement service for collecting pronunciations by accent are described.

The computer apparatus 200 may provide a client with an audio engagement service through access to a dedicated application installed on the client device or a website/mobile site related to the computer apparatus 200. An audio engagement service system implemented as a computer may be configured in the computer apparatus 200. For example, the audio engagement service system may be configured in a form of a program that independently operates or may be configured in an in-app form of a specific application to be operable on the specific application.

The processor 220 of the computer apparatus 200 may be implemented as a component for performing the following audio engagement service method. Depending on example embodiments, components of the processor 220 may be selectively included in or excluded from the processor 220. Also, depending on example embodiments, components of the processor 220 may be separated or merged for functional representation of the processor 220.

The processor 220 and the components of the processor 220 may control the computer apparatus 200 to perform operations included in the following audio engagement service method. For example, the processor 220 and the components of the processor 220 may be implemented to execute an instruction according to a code of at least one program and a code of an OS included in the memory 210.

Here, the components of the processor 220 may be representations of different functions performed by the processor 220 in response to an instruction provided from a program code stored in the computer apparatus 200.

The processor 220 may read a necessary instruction from the memory 210 to which instructions related to control of the computer apparatus 200 are loaded. In this case, the read instruction may include an instruction for controlling the processor 220 to execute the following operations.

The following operations may be performed in order different from illustrated order. A portion of operations may be omitted or an additional process may be further included.

Figure 3:
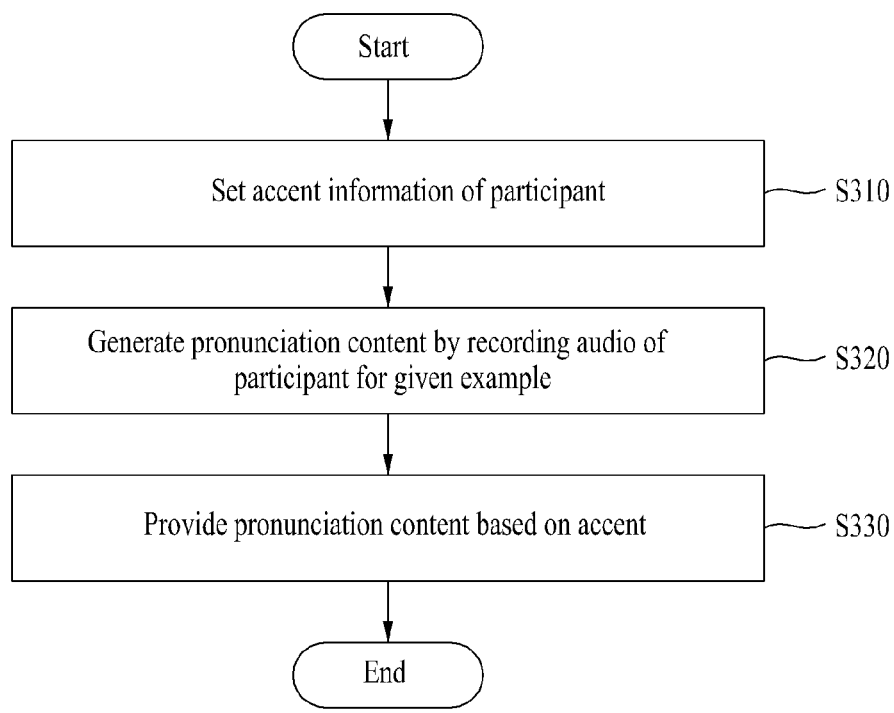
FIG. 3 is a flowchart illustrating an example of a method performed by a computer apparatus according to at least one example embodiment.

FIG. 3 is a flowchart illustrating an example of a method performed by the computer apparatus 200 according to at least one example embodiment.

Referring to FIG. 3, in operation S310, the processor 220 may set accent information of a participant through participant settings for each audio participant taking part in providing audio pronunciation. The accent information refers to language used in a country, an ethnic group, or the geographical region of the participant. For example, the processor 220 may set a language the participant mainly uses, such as a mother tongue, as accent information. In the example embodiment, pronunciations may be collected by accent for the same word or sentence in consideration that an accent is different according to a country or a geographical region of origin even for the same language. To this end, the processor 220 may set a mother tongue the corresponding participant mainly uses as accent information of an audio participant that desires to participate in collecting pronunciations.

In operation S320, the processor 220 may generate pronunciation content by recording audio that the participant utters for a given example. The processor 220 may randomly select a word, an idiom, or a sentence in a dictionary using a dictionary database and may provide the same as an example text. The processor 220 may generate pronunciation content of a corresponding accent by tagging and storing accent information of the corresponding participant for audio recording of the participant for the example text. Here, the processor 220 may tag, store, and manage demographic information (e.g., age, gender, occupation, etc.) of the corresponding participant for pronunciation content of the corresponding participant. The processor 220 may also tag demographic information on the pronunciation content of the participant, an original text provided as a sample, a type (a word, an idiom, a sentence, etc.) of the original text, and emotional tone information or topic information specified by the participant. Information tagged by the pronunciation content may be used as a filter condition for selecting and providing the pronunciation content. Also, the processor 220 may perform a sound quality inspection of the audio recording of the participant and may filter the pronunciation content according to an inspection result. For example, processor 220 may filter the pronunciation content based on a speech recognition result for participant audio and a sound evaluation result such as an amount of noise.

In operation S330, the processor 220 may provide the pronunciation content based on the accent. For example, in response to a selection on a specific accent, the processor 220 may provide a playlist that includes pronunciation content of the corresponding accent. As another example, the processor 220 may provide a playlist that includes pronunciation content of a specific example type by using a type of example, such as a word, an idiom, and a sentence, as a filter condition. As another example, the processor 220 may provide a playlist that includes pronunciation content of a specific demographic by using demographic information, such as age, gender, and occupation of an audio participant, as a filter condition. As another example, the processor 220 may provide a playlist that includes pronunciation content of a corresponding emotional tone or topic by using emotional tone information or topic information as a filter condition. Here, the processor 220 may sort a pronunciation content playlist based on content generation time, a cumulative playback count, a cumulative positive reaction (e.g., like) count, and a cumulative share count.

The processor 220 may display pronunciation content on a display screen of an electronic device having access to the audio engagement service and may also display pronunciation content through a service region of another platform interactable with the audio engagement service, for example, a dictionary platform that provides a language dictionary and a language learning service. The processor 220 may display pronunciation content in association with the language dictionary or the language learning in the dictionary platform. Here, the processor 220 may support synchronization with the dictionary platform for related data, such as playback, positive reaction, and share of the pronunciation content.

Figure 4:
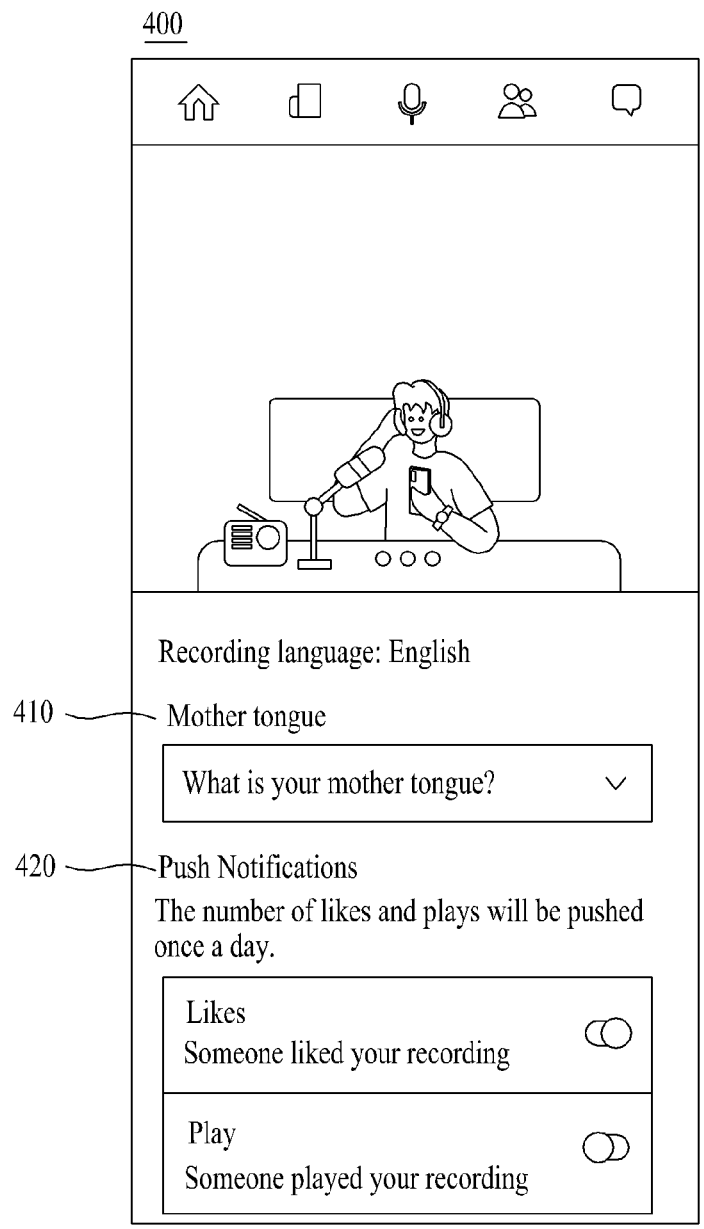
FIG. 4 illustrates an example of a service screen for setting an accent of an audio participant according to at least one example embodiment.

FIG. 4 illustrates an example of a service screen provided on an electronic device having access to the audio engagement service, for setting an accent of an audio participant according to at least one example embodiment. FIG. 4 illustrates a setting screen 400 for a service user to join as an audio participant.

Referring to FIG. 4, the setting screen 400 may include an accent interface 410 for setting accent information of an audio participant. Depending on example embodiments, the setting screen 400 may include an interface for directly setting a target language to participate in audio recording for collecting pronunciation. For example, with the assumption that a user A is from Canada, accent information of the user A may be set to Canada and a target language to participate in audio recording may be set to English.

The setting screen 400 may include a push notification interface 420 for setting whether to allow a push notification. The push notification may provide user reaction information, such as, for example, a cumulative playback count, a cumulative positive reaction count, etc., of pronunciation content generated by an audio participant as periodic information related to pronunciation content of the audio participant. The push notification interface 420 may be configured with an interface capable of optionally setting whether to allow a push notification according to a type of information.

Figure 5:
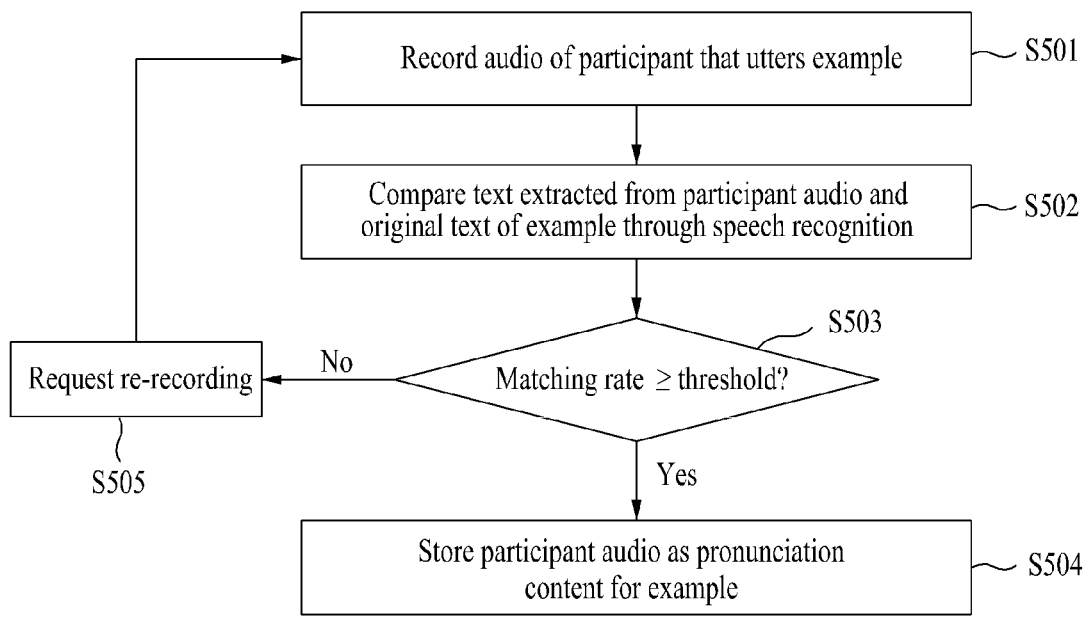
FIG. 5 is a flowchart illustrating an example of a process of collecting pronunciation content according to at least one example embodiment.

FIG. 5 is a flowchart illustrating an example of a process of collecting pronunciation content according to at least one example embodiment.

Referring to FIG. 5, in operation S501, the processor 220 may receive and record audio of a participant that utters an example text. The processor 220 may receive and record participant audio from a client, i.e., a computer device of the participant or user that uses the audio engagement service, in real time and may also receive an audio file recorded by a client.

In operation S502, the processor 220 may compare a text extracted from the participant audio and an original text provided as the example text through speech recognition technology.

In operation S503, the processor 220 may determine whether a matching rate between the text extracted through speech recognition and the original text is greater than or equal to a preset threshold.

In operation S504, when the matching rate between the text extracted through speech recognition and the original text is greater than or equal to the preset threshold, the processor 220 may store the participant audio as pronunciation content for the corresponding example.

In operation S505, when the matching rate between the text extracted through speech recognition and the original text is less than the preset threshold, the processor 220 may again request the participant for an audio of the example text.

FIGS. 6 to 11 illustrate examples of a service screen provided on an electronic device having access to the audio engagement service, for registering pronunciation content according to at least one example embodiment. FIGS. 6 to 11 illustrate a pronunciation registration screen 600.

Figure 6:
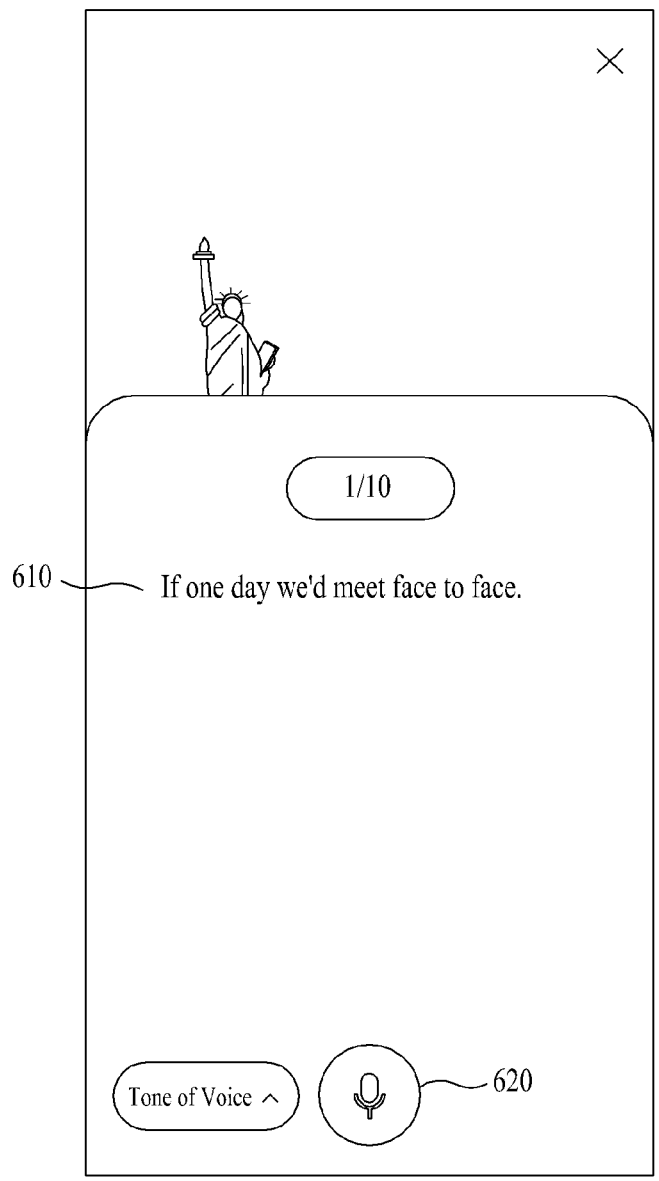
FIGS. 6 to 11 illustrate examples of a service screen for registering pronunciation content according to at least one example embodiment.

Referring to FIG. 6, the processor 220 may provide an example text 610 for collecting pronunciation through the pronunciation registration screen 600. The example text 610 may be provided in a set unit. For example, ten examples corresponding to a word, an idiom, a sentence, and the like may be provided as a single set.

The pronunciation registration screen 600 may include a "recording" interface 620 for recording participant audio that reads the example text 610. The processor 220 may record the participant audio while sequentially providing a single set of example texts 610.

Figure 7:
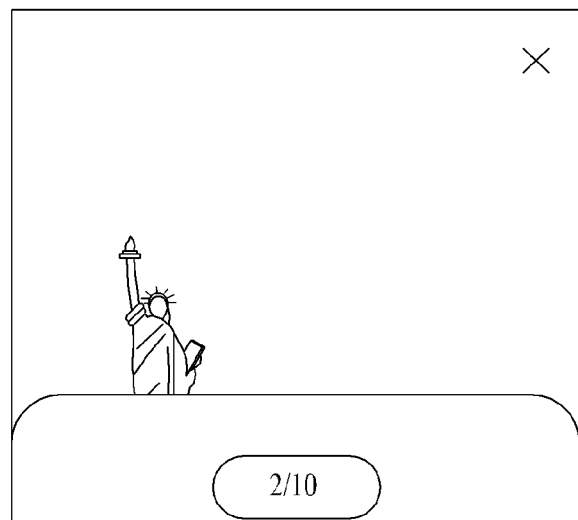
Figure 7:
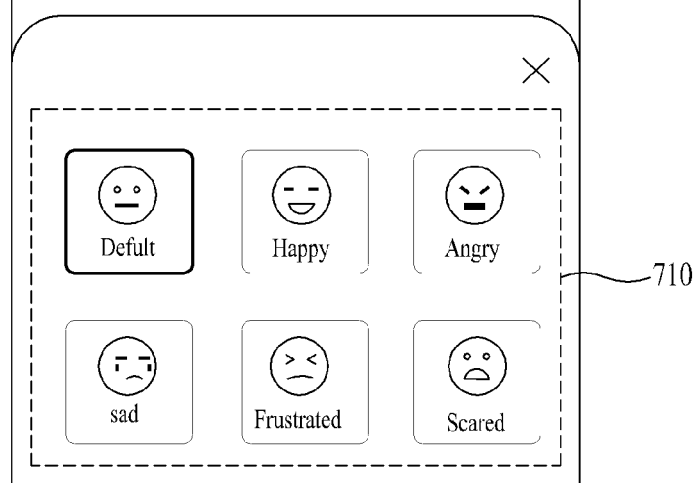

Here, the processor 220 may set tone-of-voice information prior to recording the participant audio. Referring to FIG. 7, the processor 220 may provide an emotional tone list (e.g., default, happy, angry, sad, frustrated, scared, etc.) 710 settable through the pronunciation registration screen 600. When recording, recording may proceed after specifying an emotional tone of voice. For example, if the example text 610 relates to happy content, "happy" may be selected from the emotional tone list 710 and recording may proceed. An emotional tone for recording participant audio may be directly set by the participant through the emotional tone list 710 and an appropriate emotional tone may be recommended according to the contents of the example text 610.

Also, the processor 220 may provide the example text 610 of a topic area specified by the participant to collect pronunciation content by topic area. The processor 220 may provide a topic list that may be specified through the pronunciation registration screen 600 prior to recording the participant audio and may provide the example text 610 of a topic selected from the topic list, and may collect pronunciation content of the corresponding topic.

Figure 8:
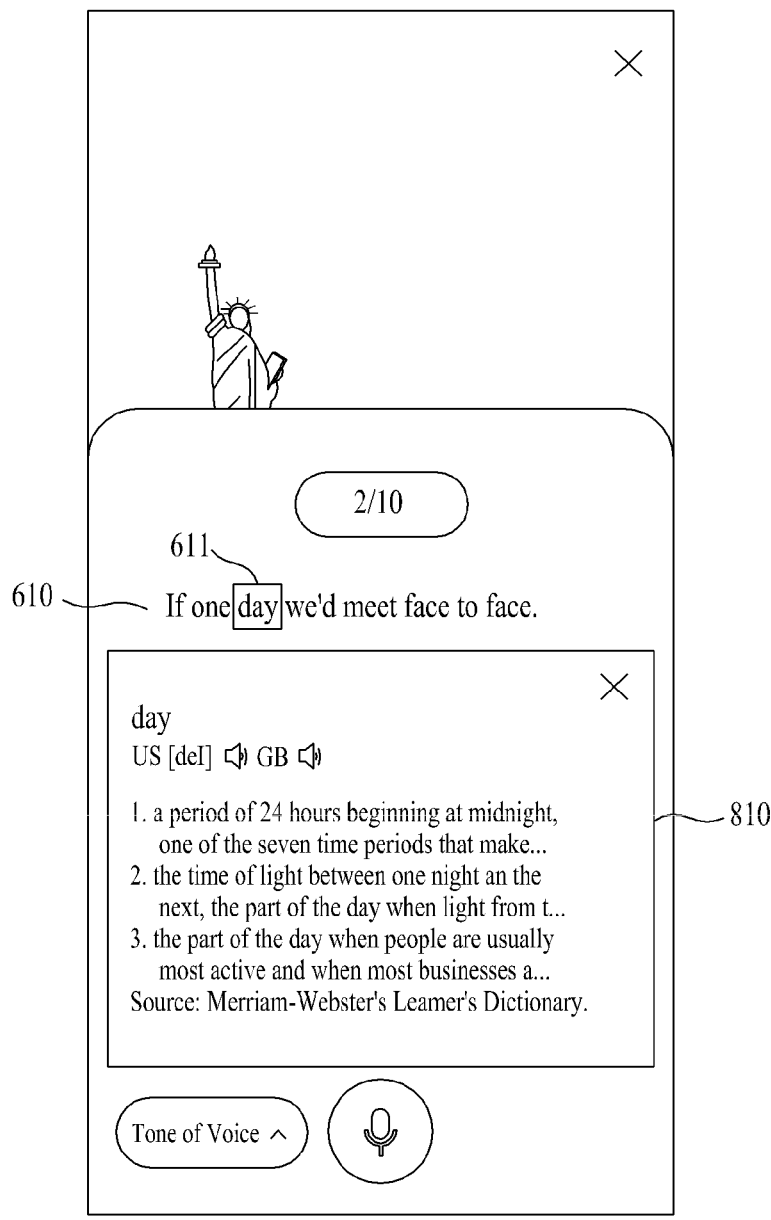

The processor 220 may provide dictionary information on a word included in the example text 610. Referring to FIG. 8, in response to a selection of a specific word 611 in the example text 610, the processor 220 may display dictionary information 810 that includes a meaning and pronunciation of the specific word 611 through an interface, such as popup.

In addition to providing the dictionary information 810, the processor 220 may provide at least one translation for the example text 610. In response to a request from the participant, the processor 220 may provide a translation result in which the example text 610 is translated in a language specified by the participant or in at least one preset language.

Figure 9:
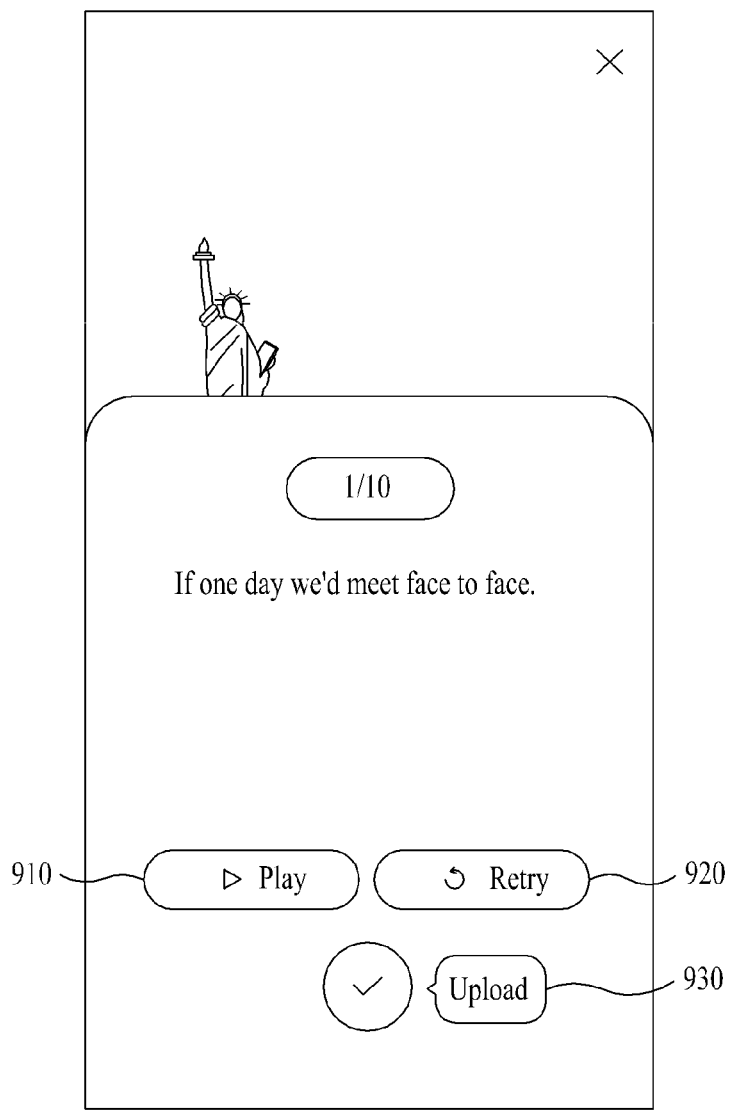

Referring to FIG. 9, when the participant completes audio recording for the example text 610 using a "record" interface 620, the processor 220 may active a "play" interface 910 for playing back the recorded audio, a "retry" interface 920 for re-recording the audio, and an "upload" interface 930 for uploading recorded audio through the pronunciation registration screen 600.

When the participant requests uploading of the recorded audio through the "upload" interface 930, the processor 220 may receive the corresponding participant audio and may perform an audio quality inspection.

Figure 10:
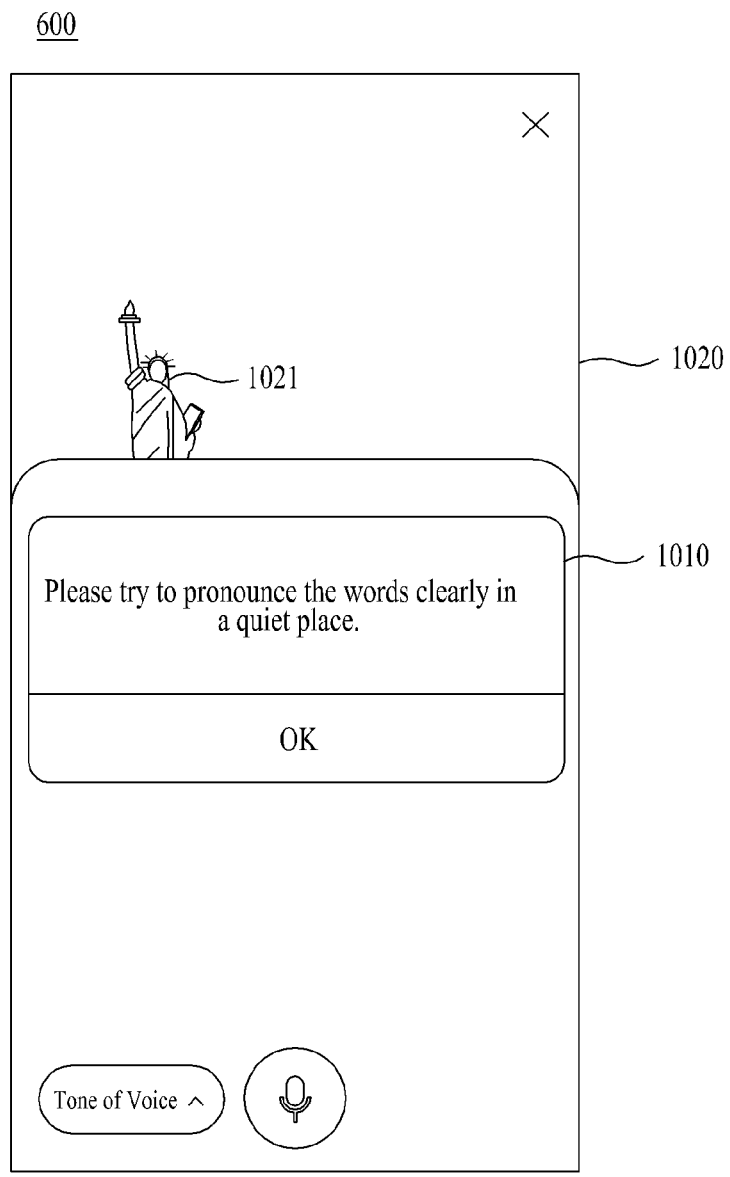

Referring to FIG. 10, when a matching rate between a text extracted from participant audio and an original text of the example text 610 is significantly low, or when a relatively large amount of noise is mixed in the participant audio as an audio inspection result, the processor 220 again may request the participant for an audio recording through a popup 1010 on the pronunciation registration screen 600.

The processor 220 may collect and register participant audio for the example text 610 as the pronunciation content through interaction with the participant using the pronunciation registration screen 600.

The processor 220 may provide the example text 610 for collecting pronunciation in a set unit and may provide a stamp that represents a symbol of a country or a geographical region representing an accent of the corresponding participant as a kind of a reward to the participant having completed a single set of pronunciation registration. For example, a stamp that represents a symbol of a corresponding country or a region may be provided for each country using English in the case of English, and for each region within a country having different accents in the case of Korean, Chinese, and Japanese. Whenever an audio participant completes a single set of pronunciation registration, a symbol stamp of a country or a region corresponding to an accent of the participant may be provided one by one.

The symbol stamp may be used as a background image of the pronunciation registration screen 600. In addition to the pronunciation registration screen 600, the symbol stamp may be used for a personal page related to the audio participant, for example, the setting screen 400 and the personal profile screen.

For example, referring to FIG. 10, the processor 220 may display a symbol stamp 1021 provided by the audio participant on a background image 1020 of the pronunciation registration screen 600. FIG. 10 illustrates the background image 1020 that includes a single symbol stamp 1021, which may represent a region of a country (e.g., a state in the United States) in which the audio participant has completed a single set of pronunciation registration.

Figure 11:
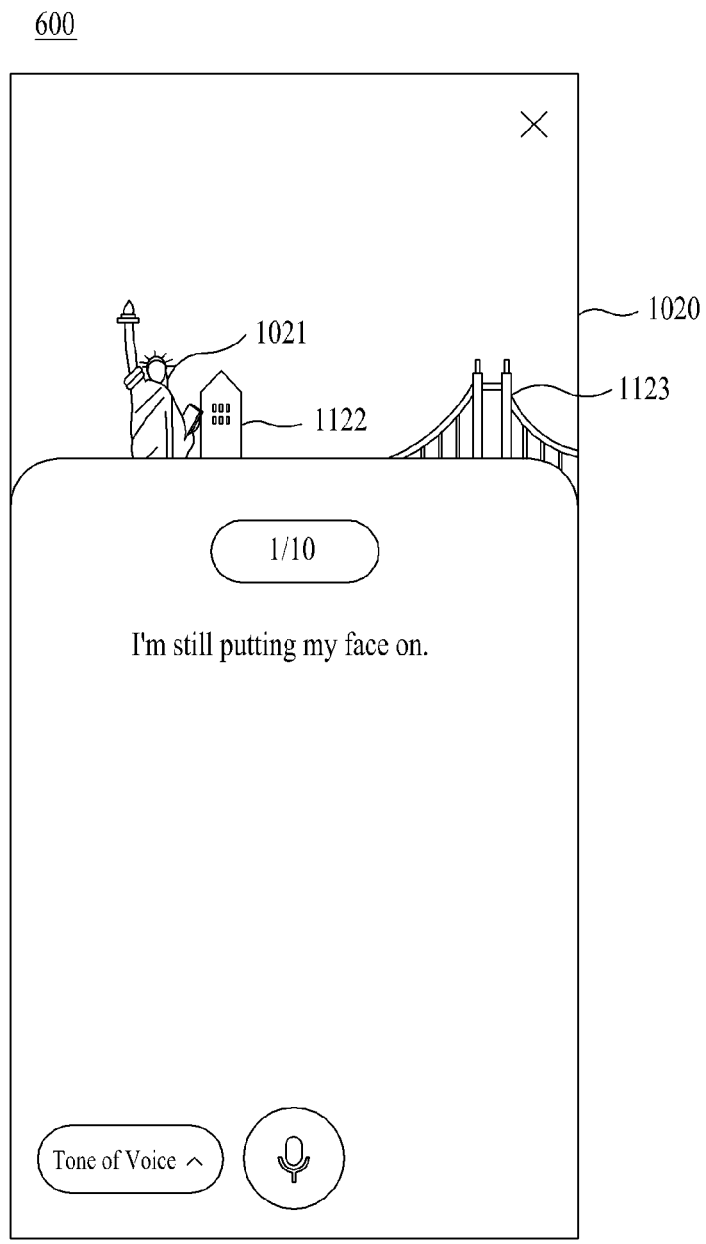

Meanwhile, FIG. 11 illustrates the background image 1020 that includes three symbol stamps 1021, 1122, and 1123, which may represent a state in which the audio participant has completed three sets of pronunciation registration.

The processor 220 may collect pronunciation content of a participant in a country unit and may provide the corresponding participant with a reward for each country. With a virtual world travel concept, participants may participate in pronunciation registration for each country while freely traveling around the country. For example, the processor 220 may issue a virtual passport to a participant, and each participant to whom a passport is issued may set a country in which a corresponding participant is present as a departure country and then may select a desired country as a travel destination. The processor 220 may register pronunciation content of a country selected as a virtual travel destination as an accent of the participant. A pronunciation content registration process may be repeated by selecting a subsequent travel destination. When a single set of pronunciation collection is completed for each country, the processor 220 may provide an entry confirmation stamp for a corresponding country to the passport of the participant. Also, the processor 220 may create and show a travel route of the corresponding participant by connecting all the countries that have stamped passport, starting with the departure country of the participant.

Therefore, the processor 220 may provide a fun element of the effect that collects and builds symbols of a country or a region corresponding to an accent of the participant by providing a symbol stamp according to a level of audio engagement for collecting pronunciation.

Figure 12:
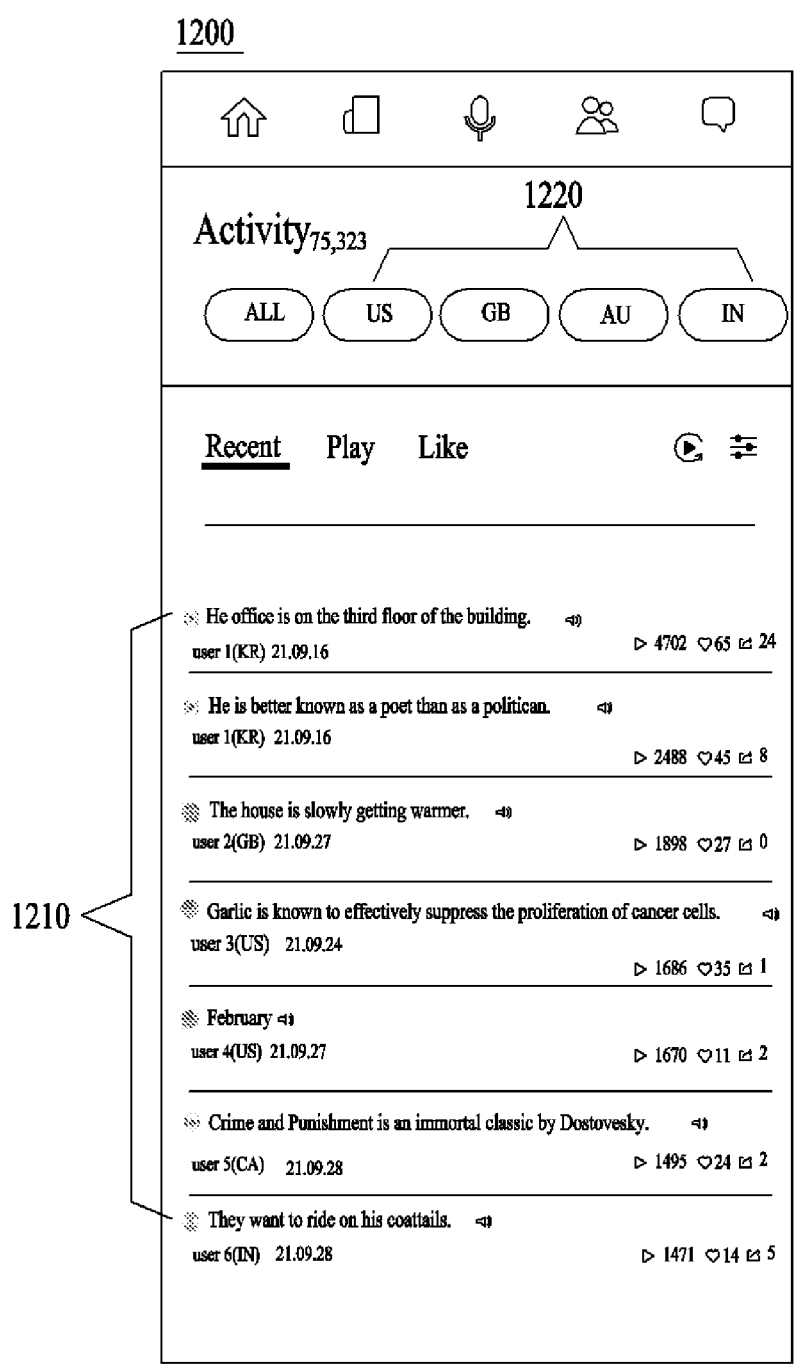
FIGS. 12 and 13 illustrate examples of a service screen for displaying pronunciation content according to at least one example embodiment.
Figure 13:
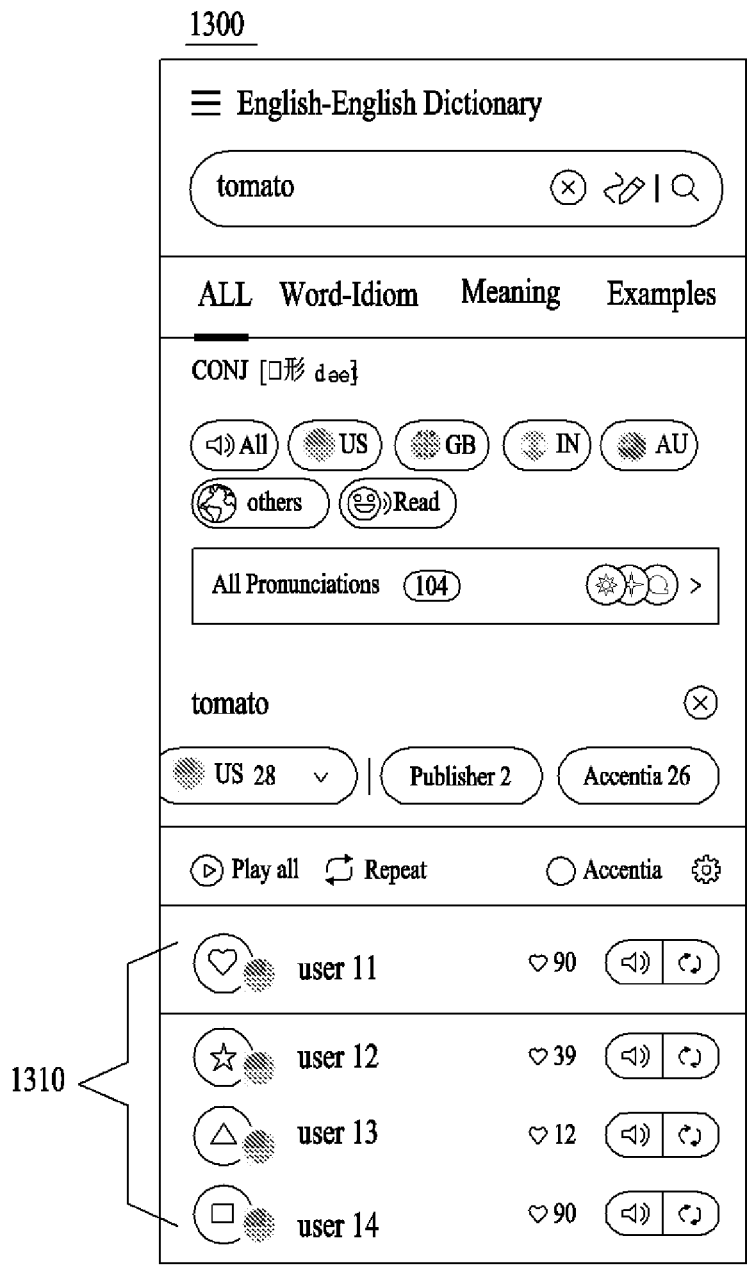

FIGS. 12 and 13 illustrate examples of a service screen on an electronic device having access to the audio engagement service, for displaying pronunciation content according to at least one example embodiment.

FIG. 12 illustrates an audio engagement service screen 1200 that is a self-display area of an audio engagement service.

Referring to FIG. 12, the processor 220 may display a pronunciation content list 1210 on the audio engagement service screen 1200.

The processor 220 may distinguishably display a pronunciation content list 1210 for each accent 1220 of an audio participant having generated pronunciation content.

The processor 220 may sort and display the pronunciation content list 1210 based on a content generation time, a cumulative playback count, a cumulative positive reaction count, and a cumulative share count.

The processor 220 may provide a detailed search for the pronunciation content list 1210 using an example type (word, idiom, sentence, etc.) or demographics (age, gender, occupation, etc.), emotional tone information, and topic information as a search filter.

The processor 220 may support a full playback of the pronunciation content list 1210 or may support a selective individual playback of each piece of the pronunciation content.

The processor 220 may provide an interface capable of inputting a positive reaction (e.g., like), an interface that allows share, and an interface capable of accessing a profile screen of an audio participant with respect to each piece of pronunciation content included in the pronunciation content list 1210 with the pronunciation content list 1210.

The processor 220 may display a cumulative playback count, a cumulative positive reaction count, and a cumulative share count for each piece of pronunciation content included in the pronunciation content list 1210 with the pronunciation content list 1210.

The processor 220 may display tone-of-voice information or topic information set when recording for each piece of pronunciation content included in the pronunciation content list 1210.

FIG. 13 illustrates a dictionary platform service screen 1300.

Referring to FIG. 13, the processor 220 may display pronunciation content on the dictionary platform service screen 1300 through interaction with a dictionary platform. For example, the processor 220 may display the pronunciation content list 1310 by including the same in a word search result on the dictionary platform service screen 1300.

The pronunciation content list 1310 related to the word search result may include pronunciation content for a search word and pronunciation content for an idiom or a sentence that includes the search word.

Likewise, the processor 220 may distinguishably display the pronunciation content list 1310 by accent and may support a full audio playback of the pronunciation content list 1310 or may support a selective individual audio playback of each piece of pronunciation content.

Also, the processor 220 may provide an interface capable of inputting a positive reaction (e.g., like), an interface that allows share, and an interface capable of accessing a profile screen of an audio participant with respect to each piece of pronunciation content included in the pronunciation content list 1310 with the pronunciation content list 1310.

Also, the processor 220 may support a share function for each piece of pronunciation content displayed on the audio engagement service screen 1200 or the dictionary platform service screen 1300, or may share a profile of an audio participant that has generated the pronunciation content. For example, the processor 220 may support a share function using a method of copying and delivering a uniform resource locator (URL) of the pronunciation content or a participant profile.

Figure 14:
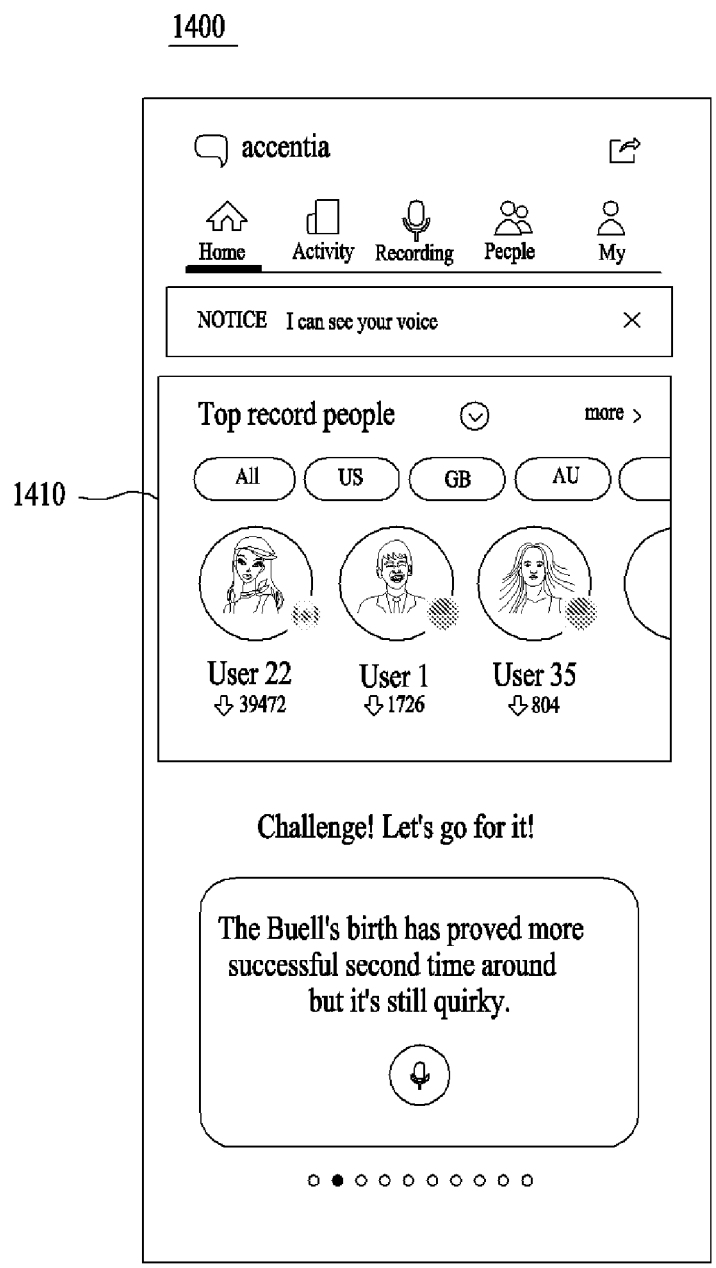
FIG. 14 illustrates an example of a service screen for providing audio participant ranking information according to at least one example embodiment.

FIG. 14 illustrates an example of a service screen for providing audio participant ranking information according to at least one example embodiment. FIG. 14 illustrates a home screen 1400 of an audio engagement service on an electronic device.

Referring to FIG. 14, the processor 220 may display audio participant ranking information 1410 according to an audio engagement rate through the home screen 1400. For example, the processor 220 may select a desired number of top-ranking audio participants based on the number of pieces of pronunciation content maintained and may provide the audio participant ranking information 1410 to the selected number of audio participants.

In addition to the audio participant ranking information 1410 according to an audio engagement rate, the processor 220 may also provide ranking information on the audio participant based on a total cumulative playback count, a total cumulative positive reaction count, and a total cumulative share count of the entire pronunciation content.

The processor 220 may distinguishably display the audio participant ranking information 1410 for each accent and may display the number of pieces of pronunciation content maintained for each audio participant.

The audio participant ranking information 1410 may play a key role in giving motivation through competition between audio participants.

Figure 15:
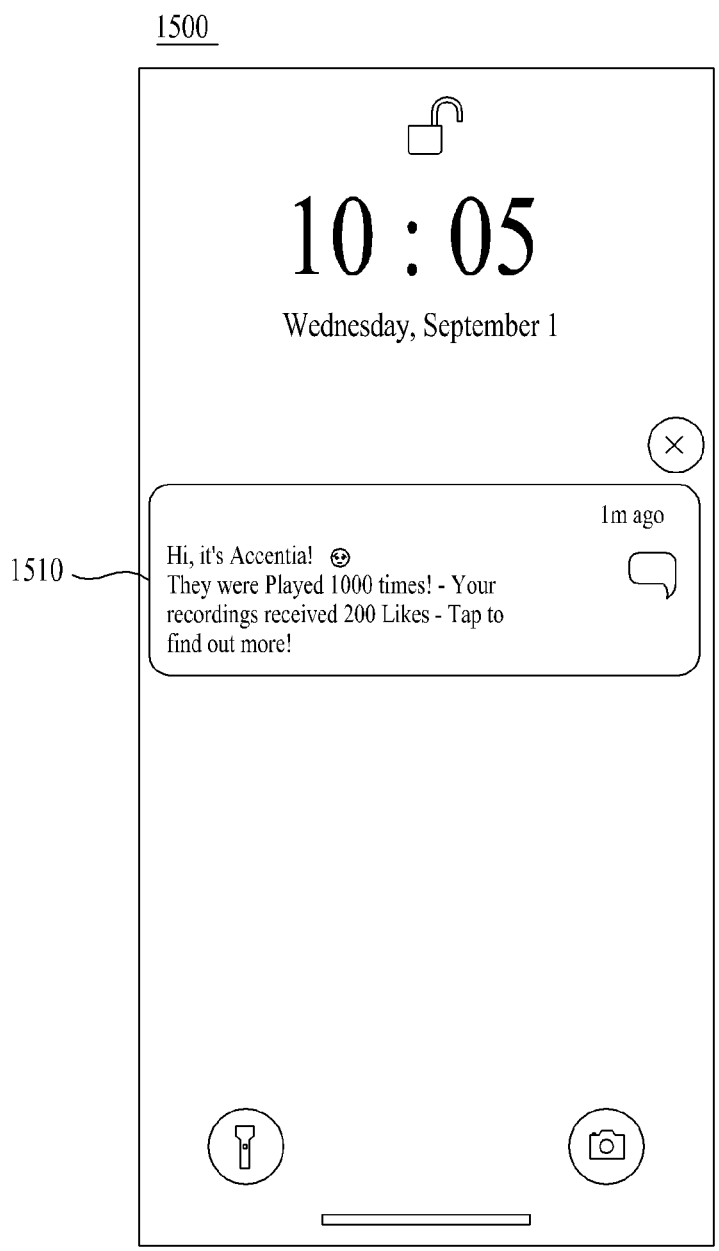
FIG. 15 illustrates an example of a screen for a push notification according to at least one example embodiment.

FIG. 15 illustrates an example of a screen for a push notification according to at least one example embodiment. FIG. 15 illustrates a terminal screen 1500 of an audio participant.

Referring to FIG. 15, the processor 220 may provide a push notification 1510 to an audio participant that allows a notification reception based on a user reaction (e.g., a cumulative playback count, a cumulative positive reaction count, etc.) to the pronunciation content of the corresponding audio participant. For example, the processor 220 may collect a user reaction to pronunciation content of an audio participant on a daily basis and may provide the push notification 1510 for a collection result once a day.

Further, the processor 220 may provide pronunciation content of another participant to which the audio participant subscribes through a subscription function. For example, the processor 220 may support a follower-based subscription relationship between users using an audio engagement service. For example, with the assumption that a participant A subscribes to a participant B, if the participant B registers new pronunciation content, the processor 220 may provide a notification for new content of the participant B to the participant A. The processor 220 may provide the participant with a new content feed of other participants to which the participant subscribes.

The processor 220 may induce continuous motivation and service revisit through the push notification 1510.

Figure 16:
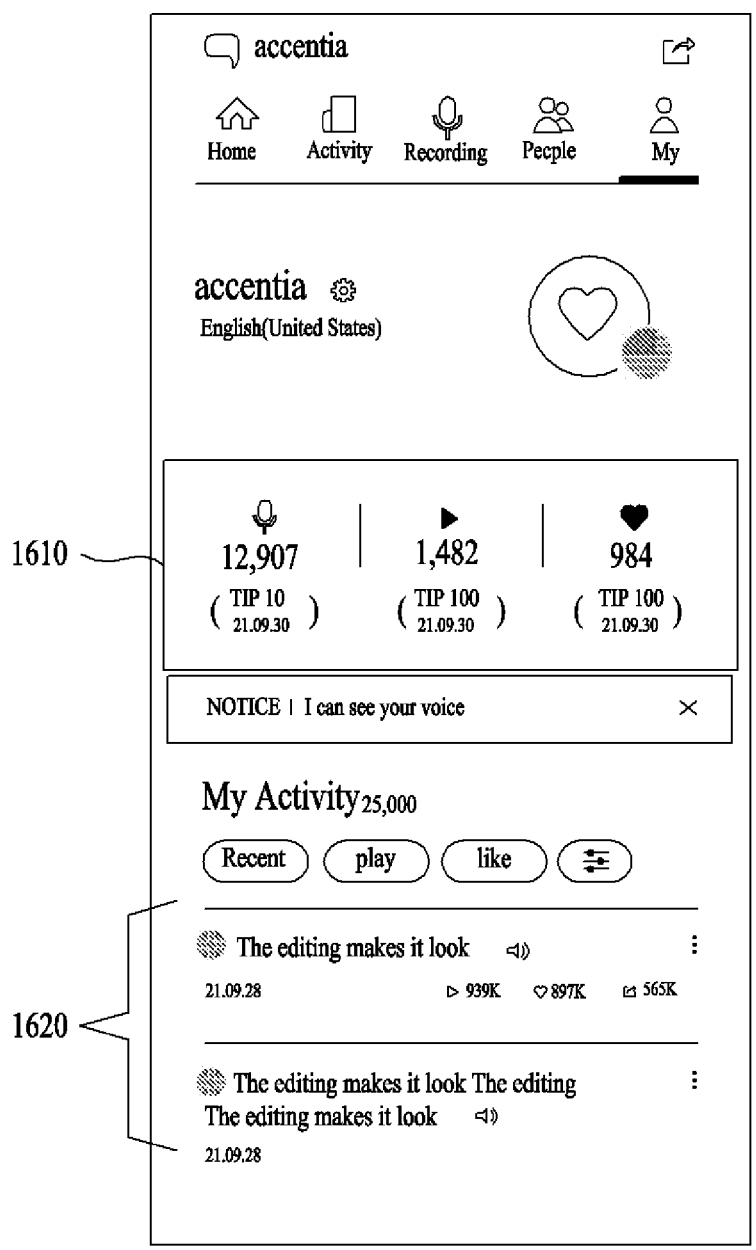
FIG. 16 illustrates an example of a personal profile screen according to at least one example embodiment.

FIG. 16 illustrates an example of a personal profile screen on an electronic device having access to the audio engagement service according to at least one example embodiment.

Referring to FIG. 16, the processor 220 may display activity information 1610 as an audio participant through a personal profile screen 1600. The activity information 1610 may include a number of pieces of pronunciation content maintained, a total cumulative playback count of the entire pronunciation content, and a total cumulative positive reaction count of the entire pronunciation content, and may include a ranking for each history.

The processor 220 may display a pronunciation content list 1620 generated by an audio participant through the personal profile screen 1600.

The processor 220 may sort and display the pronunciation content list 1620 based on content generation time, a cumulative playback count, a cumulative positive reaction count, a cumulative share count, and the like.

The processor 220 may display a cumulative playback count, a cumulative positive reaction count, a cumulative share count, and the like for each piece of pronunciation content included in the pronunciation content list 1620 with the pronunciation content list 1620.

The processor 220 may strengthen personal motivation by providing activity history of the audio participant through the personal profile screen 1600.

The personal profile screen 1600 may include a space capable of appealing to an audio participant through photos, introductions, and hashtags in addition to the activity information 1610 and the pronunciation content list 1620.

Figure 17:
FIG. 17 illustrates an example of a service screen for issuing an activity certificate of an audio participant according to at least one example embodiment.

FIG. 17 illustrates an example of a service screen on an electronic device having access to the audio engagement service, for issuing an activity certificate of an audio participant according to at least one example embodiment.

Referring to FIG. 17, in response to a request from an audio participant, the processor 220 may issue an activity certificate 1700 based on an activity history of the audio participant.

The processor 220 may strengthen personal motivation by providing the activity certificate 1700 as career information that may be used as a reference for employment and the like.

Also, the processor 220 may issue different types of reward, for example, points or performance, based on activity history or ranking of an audio participant. The points or performance issued to the audio participant may be cryptocurrency and may be cashed according to a predetermined exchange rate or may be used as cash.

The processor 220 may strengthen motivation in various manners, such as through a push notification to a user reaction, a personal profile space, a credible activity statement, a ranking, and a reward for the audio participant.

The systems or the apparatuses described herein may be implemented using hardware components, software components, and/or a combination thereof. For example, the apparatuses and the components described herein may be implemented using one or more general-purpose or special purpose computers, or processing devices such as, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. The media may also include, alone or in combination with the program instructions, data files, data structures, and the like. The media may continuously store computer-executable programs or may transitorily store the same for execution or download. Also, the media may be various types of recording devices or storage devices in a form in which one or a plurality of hardware components are combined. Without being limited to a media directly connected to a computer system, the media may be distributed over the network. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software. Examples of program instructions include both machine code, such as produced by a compiler, and files containing higher level code that may be executed by the computer using an interpreter.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An audio engagement service method performed by a computer apparatus having at least one processor configured to execute computer-readable instructions included in a memory, the audio engagement service method comprising:
   setting, via the processor, an accent indicating a country, an ethnic group, or a geographic region of a participant;
   generating, by the processor, audio uttered into a microphone by the participant of a given example text into pronunciation content of the accent, wherein the generating the audio uttered by the participant includes recording the audio uttered by the participant via an electronic device that communicates with the processor via the internet; and
   providing, by the processor, the pronunciation content with information on the accent to the electronic device,
   wherein the generating of the pronunciation content based on the audio uttered by the participant comprises:
      storing, in the memory, an example text,
      comparing, by the processor, the audio as pronunciation content with the example text to determine if a matching rate is greater than or equal to a preset threshold, and
      when the comparing, by the processor, determines that the matching rate is greater than or equal to the preset threshold, the processor stores the audio as pronunciation content in the memory, and
      when the comparing, by the processor, determines that matching rate is less than the preset threshold, the processor requests the participant for another audio of the given example text, and
   wherein the audio engagement service method further comprises:
      providing a push notification, to the participant, based on a user reaction to a pronunciation content previously recorded by the participant,
   wherein the generating of the pronunciation content comprises providing the participant with a symbol stamp of a country or a region corresponding to the accent based on an audio engagement level of the participant for the generating of the pronunciation content, wherein the symbol stamp corresponding to the accent is provided to the participant as a reward for generating the pronunciation content of the accent, and
   wherein the providing the participant with a symbol stamp comprises providing the participant with the symbol stamp of the country or the region such that the symbol stamp is displayable on a personal page associated with the participant in a collection area for symbol stamps of countries or regions previously acquired by the participant as previous rewards for previous generating of pronunciation contents.

2. The audio engagement service method of claim 1, wherein, after the participant has recorded a set unit consisting of a predetermined number of pronunciation content based on different example texts, the generating of the audio uttered by the participant comprises giving, to the participant, a symbol stamp of the country or the geographic region corresponding to the accent according to an audio engagement level for generating the pronunciation content.

3. The audio engagement service method of claim 2, wherein the symbol stamp is displayed through a personal page related to the participant.

4. The audio engagement service method of claim 1, wherein the providing of the push notification comprises aggregating the user reaction during a desired period and providing a push notification about an aggregation result.

5. The audio engagement service method of claim 1, wherein the generating of the audio uttered by the participant comprises selecting at least one of a word, an idiom, and a sentence in a dictionary, and providing the same as the example text.

6. The audio engagement service method of claim 1, wherein the generating of the audio uttered by the participant comprises generating the pronunciation content of an emotional tone or a topic specified by the participant.

7. The audio engagement service method of claim 1, wherein the generating of the audio uttered by the participant comprises tagging at least one of demographic information of the participant, the example text, a type of the example text, emotional tone information and topic information specified by the participant to the pronunciation content, and
the pronunciation content is provided under a specific condition using tagging information as a filter condition.

8. The audio engagement service method of claim 1, wherein the providing of the pronunciation content comprises, in response to a selection of a specific accent from among accents, providing a playlist that includes pronunciation content of the selected accent.

9. The audio engagement service method of claim 1, wherein the pronunciation content is sorted and provided based on at least one of a content generation time, a cumulative playback count, a cumulative positive response count, and a cumulative share count.

10. The audio engagement service method of claim 1, wherein the providing of the pronunciation content comprises providing pronunciation content of a search word and pronunciation content of an idiom or a sentence including the search word by accent with respect to a word search result of a dictionary platform through linkage with the dictionary platform.

11. The audio engagement service method of claim 1, further comprising:
providing ranking information on the participant based on at least one of a number of pronunciation contents maintained by the participant, a cumulative playback count, a cumulative positive response count, and a cumulative share count.

12. The audio engagement service method of claim 1, further comprising:
providing activity information that includes at least one of a number of pronunciation contents maintained by the participant, a cumulative playback count, a cumulative positive response count, and a cumulative share count through a personal profile screen of the participant.

13. The audio engagement service method of claim 1, further comprising:
sharing a personal profile screen or the pronunciation content of the participant.

14. The audio engagement service method of claim 1, further comprising:
providing the participant with a push notification or feedback about pronunciation content of another participant to which the participant subscribes.

15. The audio engagement service method of claim 1, wherein the push notification includes at least one of a cumulative playback count or a cumulative positive reaction count of the pronunciation content previously recorded by the participant.

16. A non-transitory computer-readable recording medium storing instructions that, when executed by a processor, cause the processor to implement the audio engagement service method of claim 1.

17. A computer apparatus comprising:
at least one processor configured to execute computer-readable instructions included in a memory,
wherein the at least one processor is configured to process:
setting, via a processor, an accent indicating a country, an ethnic group, or a geographic region of a participant;
generating, by the processor, audio uttered into a microphone by the participant of a given example text into pronunciation content of the accent, wherein the generating the audio uttered by the participant includes recording the audio uttered by the participant via an electronic device that communicates with the processor via the internet; and
providing, by the processor, the pronunciation content with information on the accent,
wherein the generating of the pronunciation content based on the audio uttered by the participant comprises:
storing, in the memory, an example text,
comparing, by the processor, the audio as pronunciation content with the example text to determine if a matching rate is greater than or equal to a preset threshold, and
when the comparing, by the processor, determines that the matching rate is greater than or equal to the preset threshold, the processor stores the audio as pronunciation content in the memory, and
when the comparing, by the processor, determines that matching rate is less than the preset threshold, the processor requests the participant for another audio of the given example text, and
wherein the generating of the pronunciation content comprises providing the participant with a symbol stamp of a country or a region corresponding to the accent based on an audio engagement level of the participant for the generating of the pronunciation content, wherein the symbol stamp corresponding to the accent is provided to the participant as a reward for generating the pronunciation content of the accent, and
wherein the providing the participant with a symbol stamp comprises providing the participant with the symbol stamp of the country or the region such that the symbol stamp is displayable on a personal page associated with the participant in a collection area for symbol stamps of countries or regions previously acquired by the participant as previous rewards for previous generating of pronunciation contents; and
wherein the at least one processor is further configured to:
provide a push notification, to the participant, based on a user reaction to pronunciation content previously recorded by the participant, and
provide the participant with a push notification or feedback about pronunciation content of another participant to which the participant subscribes.

18. The computer apparatus of claim 17, wherein The audio engagement service method of claim 1, wherein the push notification based on user reaction includes at least one of a cumulative playback count or a cumulative positive reaction count of the pronunciation content previously recorded by the participant.

19. A computer apparatus comprising:
at least one processor configured to execute computer-readable instructions included in a memory,
wherein the at least one processor is configured to process:
setting, via a processor, an accent indicating a country, an ethnic group, or a geographic region of a participant;
generating, by the processor, audio uttered into a microphone by the participant of a given example text into pronunciation content of the accent, wherein the generating the audio uttered by the participant includes recording the audio uttered by the participant via an electronic device that communicates with the processor via the internet; and
providing, by the processor, the pronunciation content with information on the accent,
wherein the generating of the pronunciation content based on the audio uttered by the participant comprises:
storing, in the memory, an example text,
comparing, by the processor, the audio as pronunciation content with the example text to determine if a matching rate is greater than or equal to a preset threshold, and
when the comparing, by the processor, determines that the matching rate is greater than or equal to the preset threshold, the processor stores the audio as pronunciation content in the memory, and
when the comparing, by the processor, determines that matching rate is less than the preset threshold, the processor requests the participant for another audio of the given example text, and
wherein the at least one processor is further configured to:
provide a push notification, to the participant, based on a user reaction to pronunciation content previously recorded by the participant, and
provide the participant with a push notification or feedback about pronunciation content of another participant to which the participant subscribes,
wherein, after the participant has recorded a set unit consisting of a predetermined number of pronunciation contents based on different example texts, the at least one processor is configured to give, to the participant, a symbol stamp of the country or the geographic region corresponding to the accent according to an audio engagement level for generating the pronunciation content, wherein the symbol stamp corresponding to the accent is provided to the participant as a reward for generating the recorded pronunciation contents, and
wherein the symbol stamp is displayable on a personal page associated with the participant in a collection area for symbol stamps of countries or regions previously acquired by the participant as previous rewards for previous generating of pronunciation contents.

* * * * *